(12) United States Patent
Lee

(10) Patent No.: US 7,932,725 B2
(45) Date of Patent: Apr. 26, 2011

(54) HACKING DETECTOR CIRCUIT FOR SEMICONDUCTOR INTEGRATED CIRCUIT AND DETECTING METHOD THEREOF

(75) Inventor: Seung-Won Lee, Seongnam-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 505 days.

(21) Appl. No.: 12/132,249

(22) Filed: Jun. 3, 2008

(65) Prior Publication Data

US 2008/0309396 A1 Dec. 18, 2008

(30) Foreign Application Priority Data

Jun. 14, 2007 (KR) .................. 10-2007-0058412

(51) Int. Cl.
*G01R 31/08* (2006.01)
*G06F 12/14* (2006.01)
(52) U.S. Cl. ................... 324/522; 713/194; 726/23
(58) Field of Classification Search ............. 324/522, 324/512, 500; 713/193, 194; 726/23, 22; 365/149; 340/541, 545.4, 562
See application file for complete search history.

(56) References Cited

U.S. PATENT DOCUMENTS

| 4,242,670 | A | * | 12/1980 | Smith ................... 340/555 |
| 5,117,457 | A | * | 5/1992 | Comerford et al. ......... 713/194 |
| 5,818,268 | A | * | 10/1998 | Kim et al. .............. 327/77 |
| 6,264,108 | B1 | * | 7/2001 | Baentsch ................. 235/487 |
| 7,398,554 | B1 | * | 7/2008 | Falik et al. ............ 726/23 |
| 2006/0072355 | A1 | | 4/2006 | Ebihara et al. |
| 2009/0049548 | A1 | * | 2/2009 | Garbe et al. ............. 726/22 |
| 2010/0169671 | A1 | * | 7/2010 | Coussieu et al. .......... 713/193 |

FOREIGN PATENT DOCUMENTS

| JP | 62-015685 | 1/1987 |
| JP | 62-288990 | 12/1987 |
| KR | 1997-0051249 | 7/1997 |

OTHER PUBLICATIONS

English Abstract for Publication No. 100198617 (for 1997-0051249).
English Abstract for Publication No. 62-015685.
English Abstract for Publication No. 62-288990.

* cited by examiner

*Primary Examiner* — Hoai-An D Nguyen
(74) *Attorney, Agent, or Firm* — F. Chau & Associates, LLC

(57) ABSTRACT

Disclosed is a semiconductor integrated circuit which includes a pre-charge capacitor connected to a check node pre-charged. A sense capacitor is configured to discharge the check node. A detector is configured to detect whether the sense capacitor is exposed, based upon a voltage of the check node after a predetermined length of time has elapsed.

23 Claims, 6 Drawing Sheets

HACKING DETECTOR CIRCUIT FOR SEMICONDUCTOR INTEGRATED CIRCUIT AND DETECTING METHOD THEREOF

CROSS-REFERENCE TO RELATED APPLICATIONS

This application claims priority under 35 U.S.C. §119 to Korean Patent Application No. 10-2007-0058412 filed on Jun. 14, 2007, the entire contents of which are hereby incorporated by reference.

BACKGROUND

1. Technical Field

The present invention disclosed herein relates to a semiconductor integrated circuit and more particularly, to a hacking detecting circuit for semiconductor integrated circuits and a detecting method thereof.

2. Discussion of the Related Art

Since the advent of the credit card in the 1920's, a number of electronic information cards have evolved such as debit (or cash) cards, credit cards, identification cards, department store cards, and the like. Recently, integrated circuit (IC) cards, named as such since a microchip is integrated into the cards, have become popular for their convenience, stability and numerous applications.

In general, IC cards include a thin semiconductor device attached to a plastic card of about the same size as a credit card. As compared to a conventional credit card, including a magnetic media strip, IC cards enjoy various benefits such as high stability, write-protected data, and high security. For this reason, IC cards have become widely accepted as the multimedia information media of the next generation.

IC cards can be roughly classified as a contact IC card, a Contactless IC Card (CICC), and a Remote Coupling Communication Card (RCCC). CICCs, such as those developed by AT&T Inc. provide a sensing distance of ½ inch. The RCCCs may be read within a distance of about 700 cm and have been standardized as ISO DIS 10536.

It is possible to classify IC cards as either a smart card or a memory card. The smart card is an IC card having an embedded microprocessor and the memory card is an IC card having no microprocessor. The smart card may include a CPU, EEPROM for storing application programs, ROM, RAM, and the like. The smart card may have high reliability/security, large-volume data storage, E-purse or electronic wallet function, the ability to store various applications, and the like. The smart card has also been applied to bi-direction communications, dispersed processing, finances, and the like. Such services are integrated into one card.

SUMMARY OF THE INVENTION

Exemplary embodiments of the present invention are directed to provide a scheme capable of detecting whether integrated circuit devices have been hacked. As used herein, the term "hacked" may mean that the integrity of the IC has bee compromised, for example by malicious intrusion.

One aspect of the present invention is directed to providing a semiconductor integrated circuit which comprises a pre-charge capacitor connected to a check node pre-charged, a sense capacitor configured to discharge the check node, and a detector configured to detect whether the sense capacitor is exposed, based upon a voltage of the check node after a predetermined time has elapses.

An aspect of the present invention is directed to provide hacking detecting method of a semiconductor integrated circuit which comprises pre-charging a pre-charge capacitor and a reference pre-charge capacitor, respectively, discharging the pre-charge capacitor using a sense capacitor, discharging the reference pre-charge capacitor using a reference capacitor, and judging the semiconductor integrated circuit to be hacked when remaining charge levels of the reference and pre-charge capacitors are over a given amount.

BRIEF DESCRIPTION OF THE FIGURES

Non-limiting and non-exhaustive exemplary embodiments of the present invention will be described with reference to the following figures, wherein like reference numerals may refer to like parts throughout the various figures. In the figures.

DETAILED DESCRIPTION OF EXEMPLARY EMBODIMENTS

Figure 1:
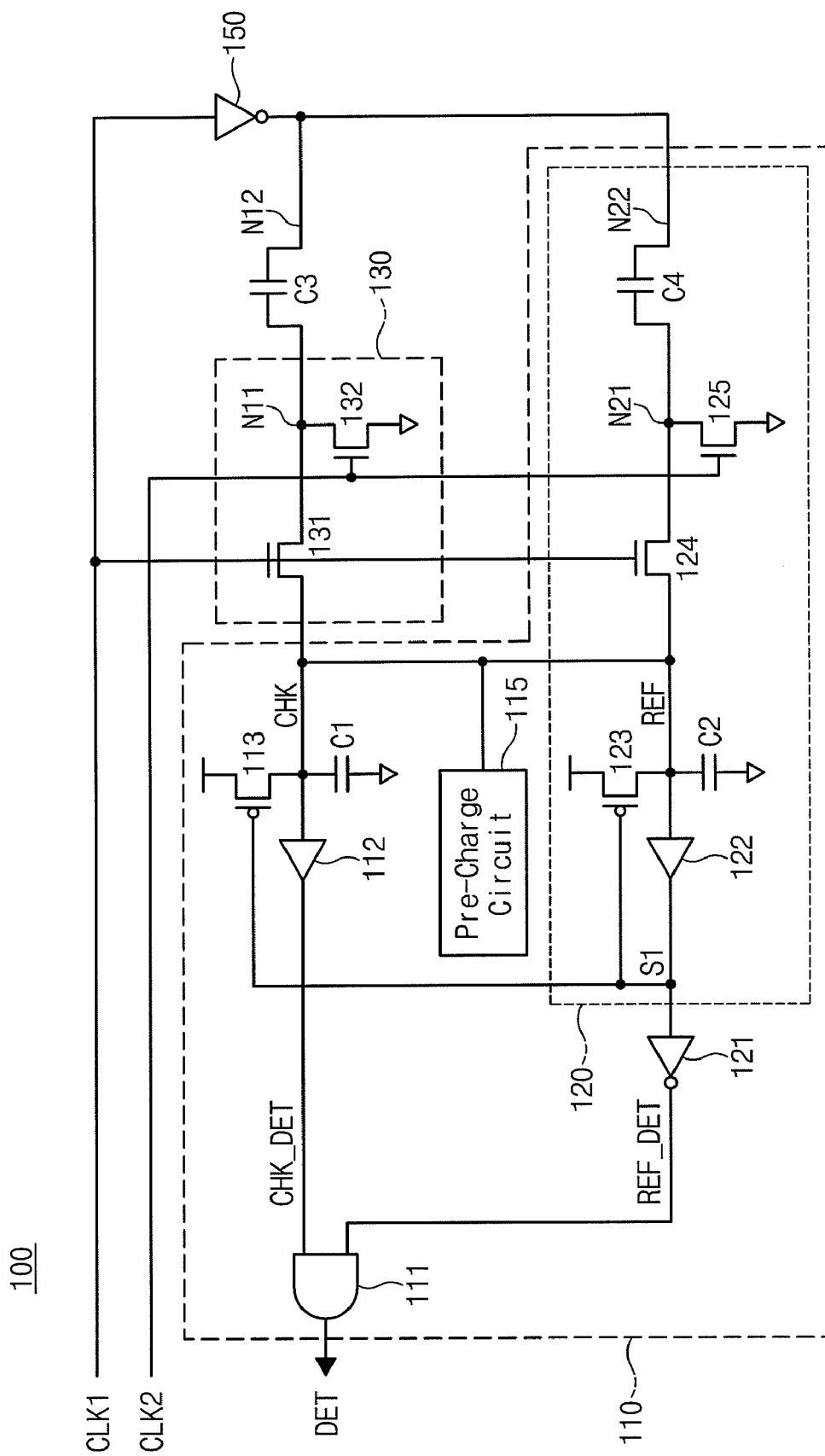
FIG. 1 is a diagram showing a hacking detector circuit in a semiconductor integrated circuit according to an exemplary embodiment of the present invention.

Exemplary embodiments of the present invention will be described below in more detail with reference to the accompanying drawings, showing a flash memory device as an example for illustrating structural and operational features. Exemplary embodiments of the present invention may, however, be embodied in different forms and should not be construed as limited to the disclosure set forth herein. Like reference numerals may refer to like elements throughout the accompanying figures.

FIG. 1 is a diagram showing a hacking detector circuit in a semiconductor integrated circuit according to an exemplary embodiment of the present invention.

Referring to FIG. 1, a hacking detector circuit 100 may include a detection signal generator 110, a discharge circuit 130, a sense capacitor C3, and an inverter 150. The detection signal generator 110 may include an AND gate 111, an inverter 121, a buffer 112, a PMOS transistor 113, a pre-charge capacitor C1, a pre-charge circuit 115, and a reference signal generator 120. The PMOS transistor 113 is connected between a power supply voltage VDD and a check node CHK and is controlled by a signal S1 from the reference signal generator 120. The pre-charge capacitor C1 is connected between the check node CHK and a ground voltage. The buffer 112 is connected to the check node CHK and outputs a check signal CHK_DET in response to a voltage of the check node CHK. The discharge circuit 130 is connected between the detection signal generator 110 and the sense capacitor C3, and has NMOS transistors 131 and 132. The NMOS transistor 131 is connected between the check node CHK and a node N11 and is controlled by a first clock signal CLK1. The sense capacitor C3 is connected between nodes N11 and N12. The NMOS transistor 132 is connected between the node N11 and a ground voltage and is controlled by a second clock signal CLK2. The inverter 150 inverts the first clock signal CLK1, and the node N12 is connected with an output of the inverter 150.

The reference signal generator 120 includes a buffer 122, a PMOS transistor 123, a reference pre-charge capacitor C2, NMOS transistors 124 and 125, and a reference capacitor C4. The PMOS transistor 123 is connected between a power supply voltage VDD and a reference node REF and is controlled by a signal S1. The reference pre-charge capacitor C2 is connected between the reference node REF and a ground node. The buffer 122 responds to a voltage of the reference node REF and outputs the signal S1. The inverter 121 inverts the signal S1 from the buffer 122 and outputs the inverted signal as a reference signal REF_DET. The NMOS transistor 124 is connected between the reference node REF and a node N21 and is controlled by the first clock signal CLK1. The NMOS transistor 125 is connected between the node N21 and a ground voltage and is controlled by the second clock signal CLK2. An output of an inverter 150 is commonly connected to nodes N12 and N22.

The pre-charge capacitor C1 and the reference pre-charge capacitor C2 may be designed to have the same capacitance. Further, the capacitors C1 and C2 may be formed to have sufficiently more capacitance than that of the sense and reference capacitors C3 and C4.

The pre-charge circuit 115 is configured to pre-charge the check node CHK and the reference node REF at an initial stage. The AND gate 111 receives the check signal CHK and the reference signal REF_DET and outputs a detection signal DET.

Figure 2A:
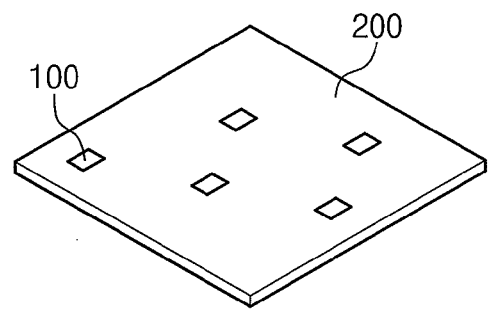
FIG. 2A is a diagram showing arrangement of a hacking detector circuit illustrated in FIG. 1 is disposed.
Figure 2B:
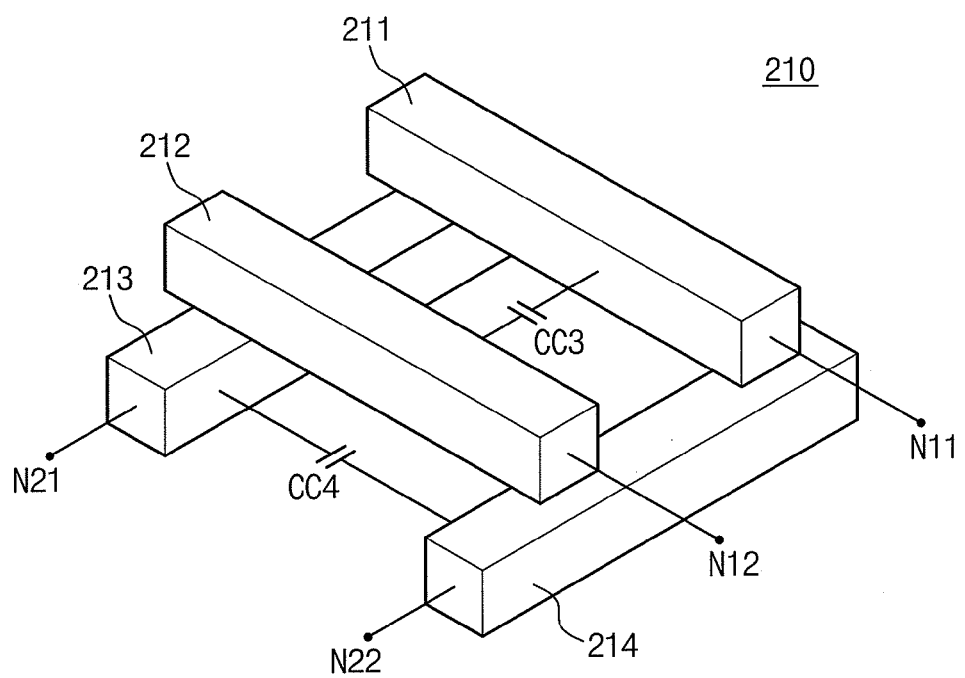
FIG. 2B is a diagram showing a layout structure of a sense capacitor and a reference capacitor illustrated in FIG. 1.

FIG. 2A is a diagram showing an arrangement of a hacking detector circuit illustrated in FIG. 1, and FIG. 2B is a diagram showing a layout structure of a sense capacitor and a reference capacitor illustrated in FIG. 1.

As illustrated in FIGS. 2A and 2B, a hacking detector circuit 100 is disposed at a semiconductor integrated circuit 200. The semiconductor integrated circuit 200 may include a plurality of hacking detector circuits 100 to facilitate hacking detection.

The semiconductor integrated circuit 200, for example a smart card, should store data safely. Data integrity may be damaged when attempts are made to access the data in the semiconductor integrated circuit 200 in an unauthorized fashion. Accordingly, exemplary embodiments of the present invention seek to monitor the integrity of the integrated circuit. One approach to accessing data from an integrated circuit in an unauthorized fashion includes removing a silicon oxide film covering a surface of a chip and exposing a metal line on a surface of the chip. The metal line may then be monitored, for example, using an oscilloscope. This process is referred to as "de-capsulation". In order to prevent chip internal signals from being monitored, the hacking detector circuit 100 according to an exemplary embodiment of the present invention may activate a detection signal DET indicating whether a chip is de-capsulated. As the number of hacking detector circuits 100 is increased, it is possible to accurately detect whether the semiconductor integrated circuit 200 is hacked by unauthorized users.

A layout structure 210 of a sense capacitor C3 and a reference capacitor C4 is illustrated in FIG. 2B. The sense capacitor C3 has a first electrode 211 connected to the node N11 and a second electrode 212 connected to the node N12. The reference capacitor C4 has a first electrode 213 connected with the node N21 and a second electrode 214 connected with the node N22. The electrodes 211-214 may be formed of a metal line such as aluminum, copper, or the like. Gaps between the electrodes 211-214 are filled up with an insulating material, which includes a material such as a silicon oxide film. The pre-charge and reference pre-charge capacitors C1 and C2 may be formed at a lower region of the sense and reference capacitors C3 and C4. Capacitance CC3 between the electrodes 211 and 212 of the sense capacitor C3 is designed to be greater than that capacitance CC4 between the electrodes 213 and 214 of the reference capacitor C4 at a normal state where the semiconductor integrated circuit 200 is not hacked (CC3>CC4). In a case where the semiconductor integrated circuit 200 is hacked, the capacitance CC3 between the electrodes 211 and 212 of the sense capacitor C3 is designed to be less than that capacitance CC4 between the electrodes 213 and 214 of the reference capacitor C4 (CC3<CC4).

Therefore, if a voltage of a check node CHK is lower than that of a reference node REF, a dielectric film between the electrodes 211 and 212 may be judged to be not damaged. If a voltage of the check node CHK is higher than that of the reference node REF, a dielectric film between the electrodes 211 and 212 may be judged to be damaged.

Capacitance of a capacitor is proportional to electrode area and length. Accordingly, capacitance of a capacitor may be increased by making electrode area and length large. Further, a size of the sense capacitor C3 may be formed to be sufficiently large considering capacitance distortion of the sense capacitor C3 due to parasitic capacitance on the semiconductor integrated circuit 200. However, increase in a size of the sense capacitor C3 may cause an increase in a size of the semiconductor integrated circuit 200. Further, increased size may make it easier for the sense capacitors C3 to be exposed. For this reasons, the size of the sense capacitor C3 may be minimized.

Figure 3:
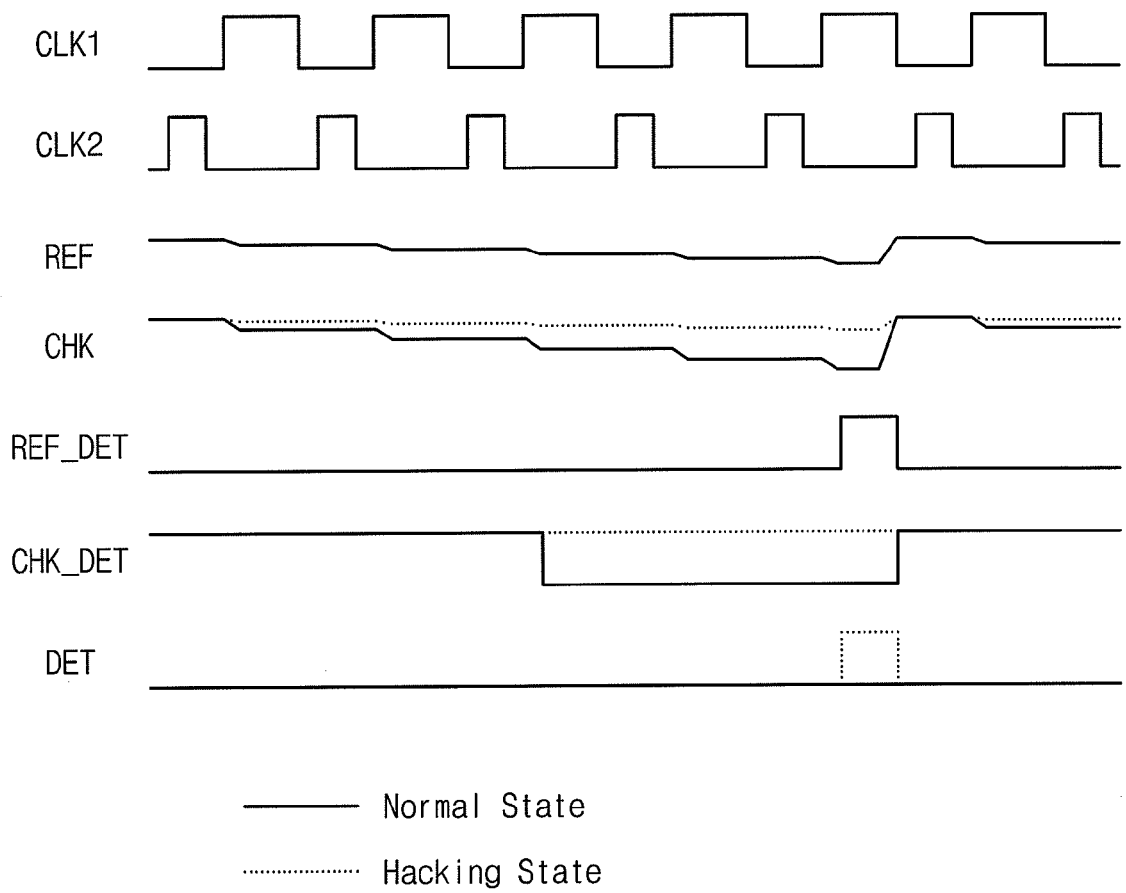
FIG. 3 is a timing diagram for describing an operation of a hacking detector circuit illustrated in FIG. 1.
Figure 4:
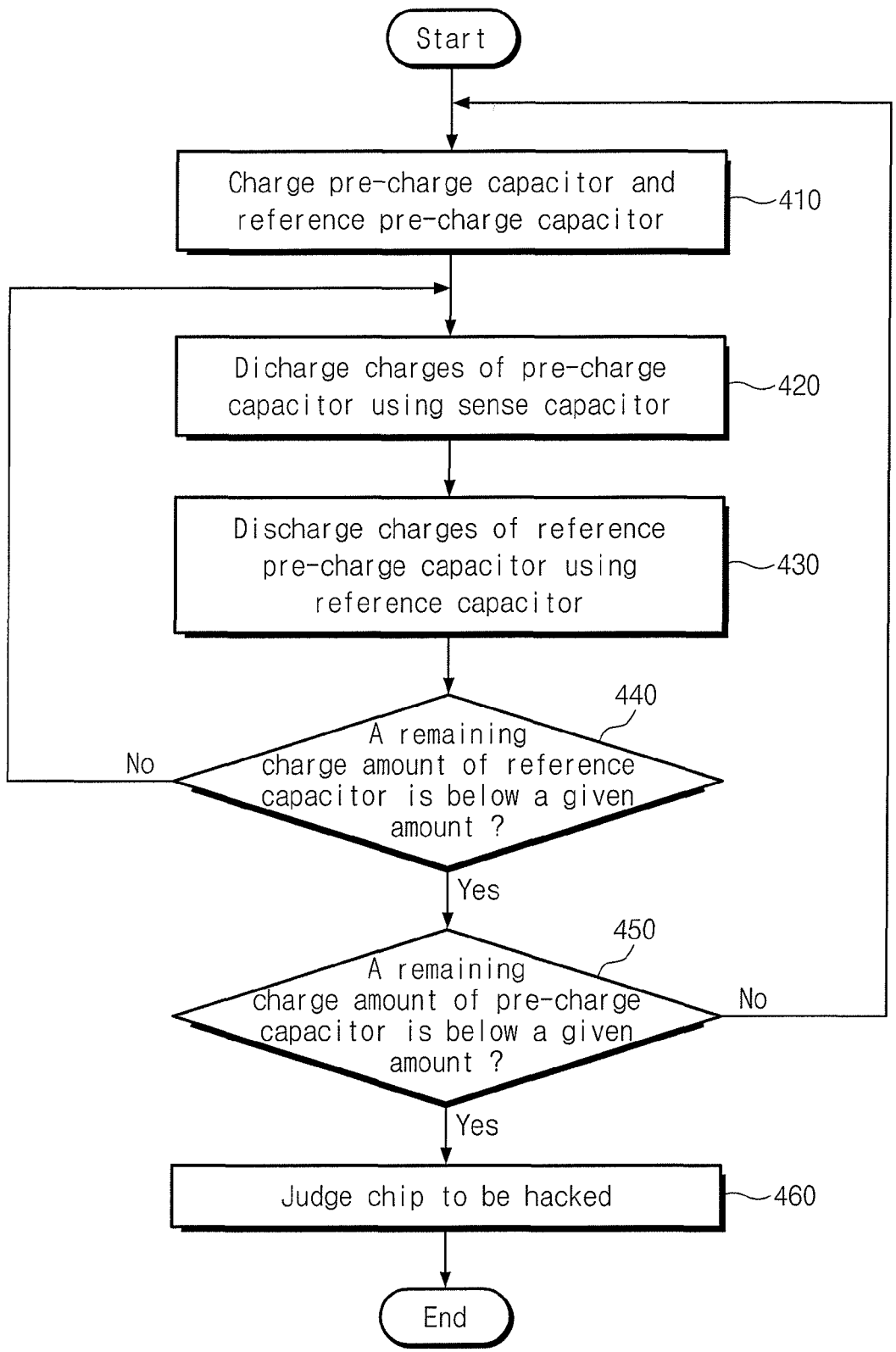
FIG. 4 is a flow diagram for describing an operation of a hacking detector circuit illustrated in FIG. 1.

FIG. 3 is a timing diagram describing an operation of a hacking detector circuit illustrated in FIG. 1, and FIG. 4 is a flow diagram describing an operation of a hacking detector circuit illustrated in FIG. 1. An operation of a hacking detector circuit 100 in FIG. 1 will be more fully described with reference to FIG. 3.

At step 410, a pre-charge circuit 115 pre-charges a check node CHK and a reference node REF to a given voltage (for example, a power supply voltage. The check node CHK may be at one end of a pre-charge capacitor C1 and the reference node REF may be at one end of a reference pre-charge capacitor C2. When the reference node REF is pre-charged with the given voltage, an output signal S1 of a buffer 122 has a high level. This turns off PMOS transistors 113 and 123.

As each of a first clock signal CLK1 and a second clock signal CLK2 transitions to a high/low level, NMOS transistors 131 and 124 are turned on/off, and NMOS transistors 132 and 125 are turned off/on, respectively. This enables charges in the pre-charge capacitor C1 and the reference pre-charge capacitor C2 to be discharged via the sense capacitor C3 and the reference capacitor C4, steps 420 and 430 respectively. A discharge operation of the capacitors C1 and C2 will be more fully described below.

The first and second clock signals CLK1 and CLK2 are complementary, and a duty ratio of the first clock signal CLK1 is longer than that of the second clock signal CLK2. When the first clock signal CLK1 goes to a high level, the NMOS transistors 131 and 124 are turned on. At this time, since an inverted version of the first clock signal CLK1 is applied to the node N12 via an inverter 150, charges corresponding to capacitance CC3 are charged at the sense capacitor C3. If the first clock signal CLK1 goes to a low level and the second clock signal CLK2 goes to a high level, the NMOS transistor 131 is turned off and the NMOS transistor 132 is turned on. Thus, charges at the capacitor C3 are discharged via the NMOS transistor 132. At this time, a voltage of the node N12 is increased up to a power supply voltage VDD via the inverter 150.

At a next cycle where the first clock signal CLK1 returns to a high level, an amount of charge in the sense capacitor C3 is expressed by Q=C*V=C*(2*VDD−ΔV).

Herein, C is capacitance of the sense capacitor C3, V is a voltage of the node N11, and ΔV is a voltage reduced at a previous cycle. Since a voltage of the node N12 is a power supply voltage at a previous cycle of the first and second clock signals CLK1 and CLK2, a voltage of the check node CHK is reduced in proportion to 2VDD via the sense capacitor C3 and the NMOS transistor 132.

As the first and second clock signals CLK1 and CLK2 transition periodically to have a high level and a low level, the capacitor C3 is charged and discharged. This enables a voltage of the check node CHK to be increased stepwise. Likewise, as the NMOS transistors 124 and 125 are turned on and off in turn, the reference capacitor C4 is charged and discharged. This reduces a voltage of the reference node REF in a stepwise manner.

When a dielectric film is not damaged, capacitance CC3 of the sense capacitor C3 is greater than the capacitance CC4 of the reference capacitor C4. Accordingly, a voltage of the check node CHK is lowered faster than that of the reference node REF. If a voltage of the reference node REF is sufficiently lowered after given cycles of the first and second clock signals CLK1 and CLK2, in step 440, the buffer 122 may output the signal S1 of a low level. The inverter 121 inverts the signal S1 and outputs a reference signal REF_DET of a high level. At this time, when a voltage of the check node CHK is sufficiently lowered, in step 450, the buffer 112 outputs a check signal CHK_DET of a low level. Accordingly, the detection signal DET is maintained at a low level. As the signal S1 goes to a low level, in step 410, the PMOS transistors 113 and 123 are turned on. This enables the check and reference nodes CHK and REF to be pre-charged with a power supply voltage.

If a dielectric film between the electrodes 211 and 212 of the sense capacitor C3 is removed, its capacitance CC3 is reduced. This slowly lowers a voltage of the check node CHK as illustrated in FIG. 3. After a time elapses, the check signal CHK_DET is maintained at a high level when the reference signal REF_DET becomes high. Accordingly, in step 460, the AND gate 111 outputs the detection signal DET of a high level indicating that a semiconductor integrated circuit is hacked.

With the above-described configuration, the hacking detector circuit 100 of the present invention may judge whether a dielectric film surrounding the sense capacitor C3 is removed, based upon an amount of charge remaining at the pre-charge capacitor C1 after charges of the pre-charge capacitor pre-charged with a power supply voltage are discharged stepwise and after a predetermined time elapses. The present hacking detector circuit 100 is capable of detecting hacking of a semiconductor integrated circuit by accumulating an amount of discharged charges of the pre-charge capacitor C1 during a given time although the sense capacitor C3 arranged on a surface of the semiconductor integrated circuit is designed to be small as compared with the pre-charge capacitor C1. Accordingly, although a size of the sense capacitor C3 is designed to be relatively small, the hacking detector circuit according to exemplary embodiments of the present invention is capable of preventing hacking of the semiconductor integrated circuit from being abnormally detected due to parasitic capacitance.

If a size of the sense capacitor C3 becomes small, the size of the hacking detector circuit 100 may be reduced. Accordingly, the number of hacking detector circuits 100 in the semiconductor integrated circuit 200 is increased. As the number of hacking detector circuits 100 in the semiconductor integrated circuit 200 is increased, although an insulating film (not shown) formed on a surface of the semiconductor integrated circuit 200 is partially removed, precise detection of hacking may still be achieved.

Figure 5:
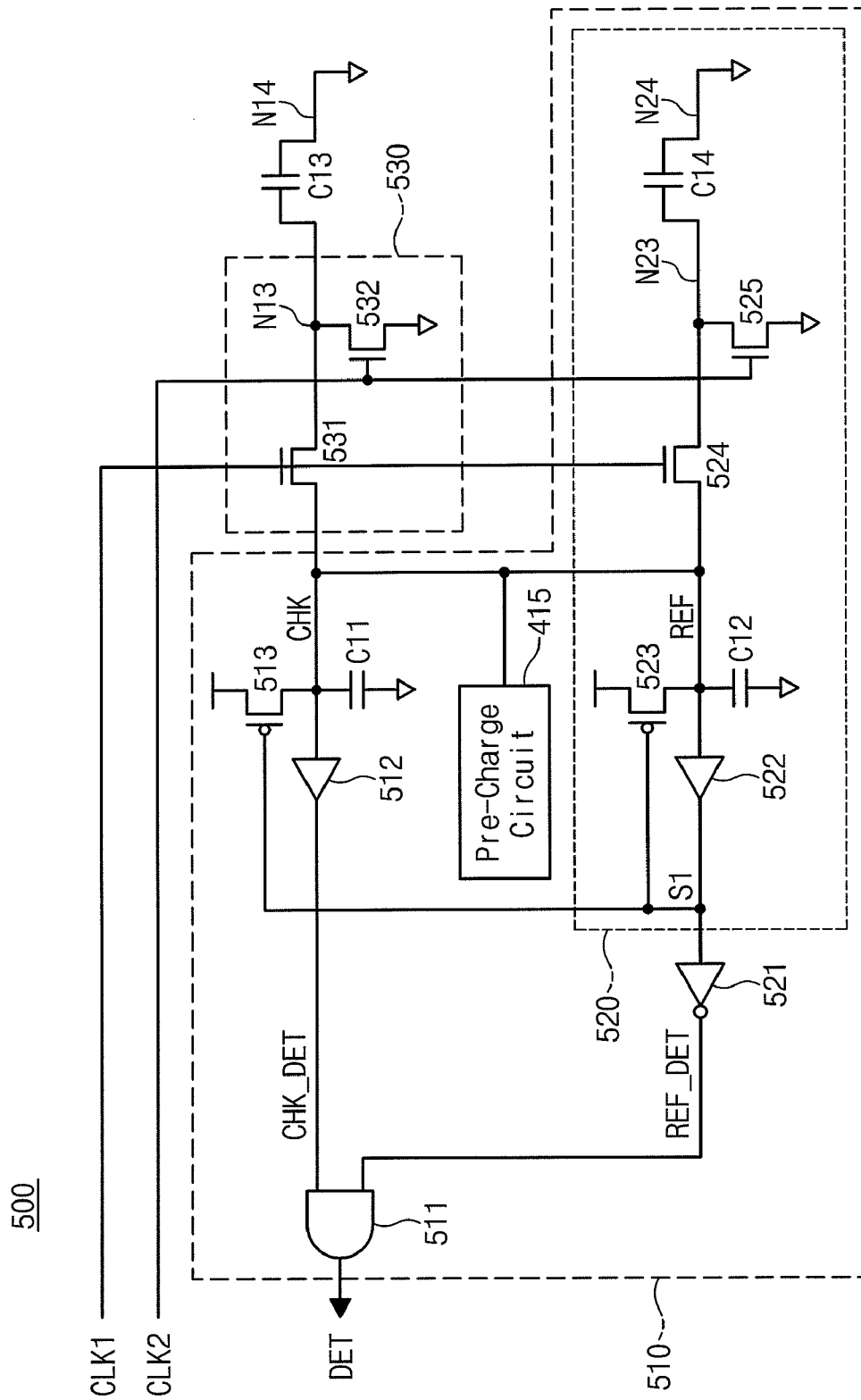
FIG. 5 is a circuit diagram showing a hacking detector circuit according to an exemplary embodiment of the present invention.

FIG. 5 is a circuit diagram showing a hacking detector circuit according to an exemplary embodiment of the present invention.

As with the hacking detector circuit 100 illustrated in FIG. 1, a first clock signal CLK1 is applied to one end N12 of a sense capacitor C3 and one end N22 of a reference capacitor C4 via an inverter 150. Unlike the hacking detector circuit in FIG. 1, a hacking detector circuit 500 illustrated in FIG. 5 is configured such that the ends N14 and N24 of sense and reference capacitors C13 and C14 are grounded. The hacking detector circuit 500 in FIG. 5 is otherwise similar to that in FIG. 1.

When first and second clock signals CLK1 and CLK2 transition from high/low to low/high, an amount of charge in the sense capacitor C13 is expressed by Q=C*V=C*(VDD−ΔV).

Herein, C is capacitance of the sense capacitor C13, V is a voltage of the node N13, and ΔV is a voltage lowered at a previous cycle of the first and second clock signals CLK1 and CLK2.

Since the node N12 has a power supply voltage VDD at a previous cycle of the first and second clock signals CLK1 and CLK2, a check node CHK may be lowered in proportion to VDD via the sense capacitor C3 and an NMOS transistor 132.

As understood from the above-described equations, if one end of each of the sense and reference capacitors are grounded, for example at nodes N12 and N22, discharge speeds of check and reference nodes CHK and REF are doubled as compared with the case where they are connected to the first clock signal CLK1. Although, as compared with the hacking detector circuit illustrated in FIG. 1, it may take twice as long until hacking may be detected after the nodes CHK and REF are pre-charged with a power supply voltage. The present hacking detector circuit 500 is capable of detecting whether or not hacking has occurred in a semiconductor integrated circuit by virtue of the sense capacitor C13, which has a small size.

Figure 6:
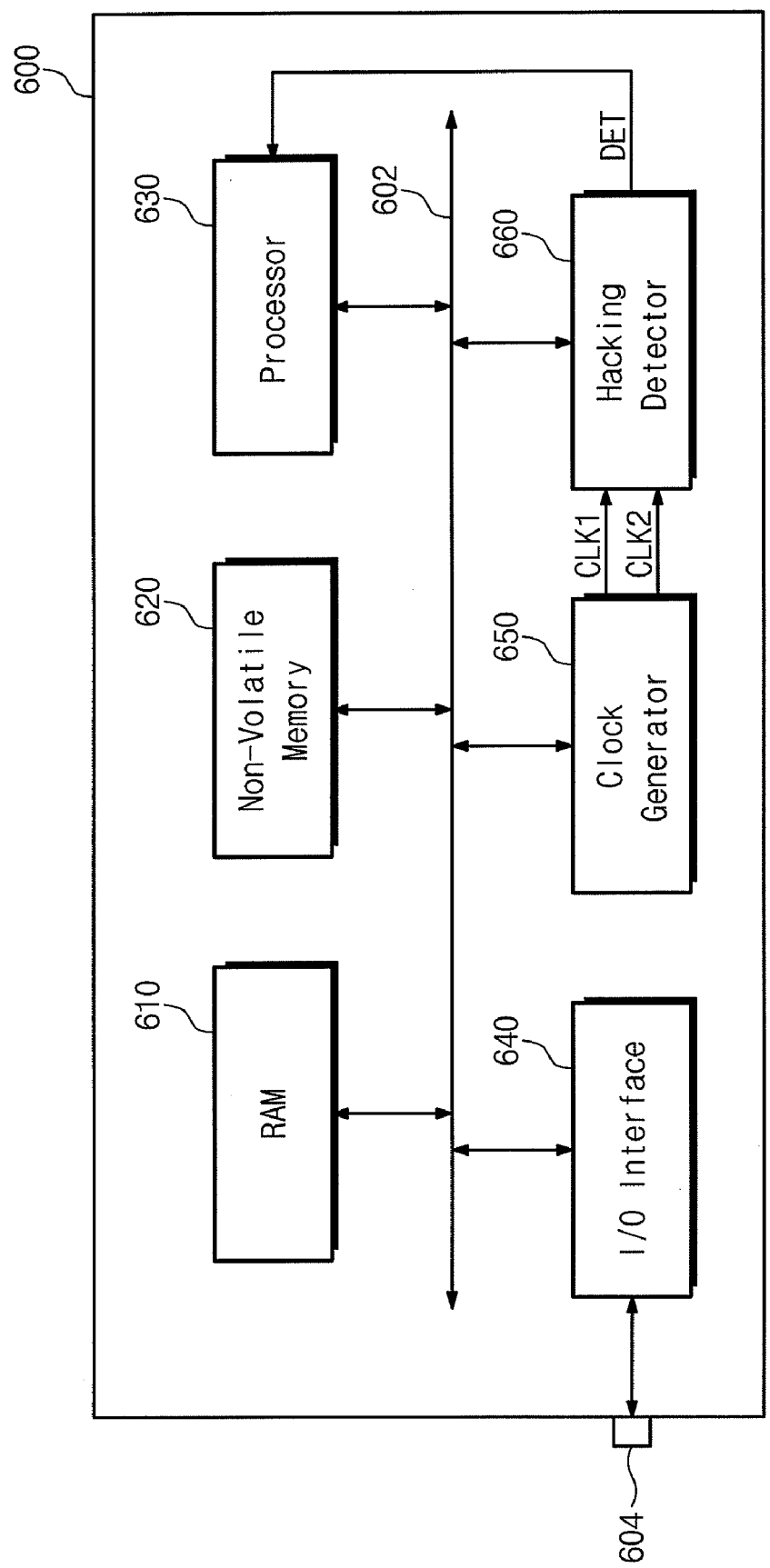
FIG. 6 is a block diagram showing a smart card including a hacking detector circuit according to an exemplary embodiment of the present invention.

FIG. 6 is a block diagram showing a smart card including a hacking detector circuit according to an exemplary embodiment of the present invention.

Referring to FIG. 6, a smart card chip 600 may include RAM 610, a non-volatile memory 620, a processor 630, an input/output interface 640, a clock generator 650, and a hacking detector circuit 660, which are connected to each other via a bus 602. The input/output interface 640 is connected to the external (e.g., a host) via terminals for receiving external power and terminals 604 for data communications. The input/output interface 640 may conform to a USB protocol, International Standardization Organization (ISO) 7816, and the like.

The clock generator 650 may generate clock signals for the smart card chip 600 in response to control signals from the input/output interface 640. Further, the clock generator 650 may generate first and second clock signals for the hacking detector circuit 660. The hacking detector circuit 660 responds to the first and second clock signals CLK1 and CLK2 to detect whether an insulating film formed on a surface of the smart card chip 600 is removed. The hacking detector circuit 660 outputs a detection signal DET to the processor 630 based upon the detection result. The hacking detector circuit 660 may be configured as that illustrated in FIG. 1 or FIG. 5.

The processor 630 resets the smart card chip 600 in response to activation of the detection signal DET from the hacking detector circuit 660, so that data stored in the memories 610 and 620 or data transferred via the bus 602 is prevented from being observed or damaged by hacking.

The above-disclosed subject matter is to be considered illustrative, and not restrictive, and the appended claims are intended to cover all such modifications, enhancements, and other embodiments, which fall within the true spirit and scope of the present invention.

What is claimed is:

1. A semiconductor integrated circuit comprising:
   a pre-charge capacitor connected to a pre-charged check node;
   a sense capacitor configured to discharge the pre-charge capacitor when the sense capacitor is exposed; and
   a detector configured to periodically detect whether the sense capacitor is exposed, based upon a voltage of the check node.

2. The semiconductor integrated circuit of claim 1, wherein a capacitance of the sense capacitor is less than a capacitance of the pre-charge capacitor.

3. The semiconductor integrated circuit of claim 2, wherein the sense capacitor discharges stepwise during the detection period.

4. The semiconductor integrated circuit of claim 2, further comprising:
   a discharge circuit connected between the check node and one end of the sense capacitor and configured to discharge the sense capacitor in response to first and second clock signals.

5. The semiconductor integrated circuit of claim 4, wherein the discharge circuit comprises:
   a first transistor, controlled by the first clock signal, connected between the check node and the one end of the sense capacitor; and
   a second transistor, controlled by the second clock signal, connected between the one end of the sense capacitor and a ground voltage.

6. The semiconductor integrated circuit of claim 5, wherein the detector comprises:
   a buffer configured to output a check signal in response to a voltage of the check node;
   a reference signal generator circuit configured to generate a reference signal; and
   a logic circuit configured to compare the check signal and the reference signal and to output a detection signal indicating whether the sense capacitor is exposed.

7. The semiconductor integrated circuit of claim 6, wherein the reference signal generator circuit comprises:
   a reference pre-charge capacitor connected between a reference node and a ground voltage;
   a reference capacitor connected to a second node;
   a third transistor connected between the reference node and the first node and controlled by the first clock signal; and
   a fourth transistor connected between the first node and a ground voltage and controlled by the second clock signal.

8. The semiconductor integrated circuit of claim 7, wherein at a normal mode, a voltage of the check node is discharged faster than that a voltage of the reference node.

9. The semiconductor integrated circuit of claim 8, wherein when the sense capacitor is exposed, a voltage of the check node is discharged slower than a voltage of the reference node.

10. The semiconductor integrated circuit of claim 7, wherein the pre-charge capacitor and the reference pre-charge capacitor have the same size.

11. The semiconductor integrated circuit of claim 10, wherein the reference capacitor is smaller in size than the reference pre-charge capacitor.

12. The semiconductor integrated circuit of claim 11, wherein at a normal state, a capacitance of the sense capacitor is more than that of the reference capacitor.

13. The semiconductor integrated circuit of claim 12, wherein when the sense capacitor is exposed, the capacitance of the sense capacitor is less than the capacitance of the reference capacitor.

14. The semiconductor integrated circuit of claim 13, wherein the detector further comprises a pre-charge circuit that is configured to pre-charge the check node and the reference node with a given voltage.

15. The semiconductor integrated circuit of claim 14, wherein the reference signal generator circuit further comprises:
   a buffer configured to output a first signal in response to a voltage of the reference node;
   an inverter configured to invert the first signal to output the reference signal; and
   a first pre-charge transistor connected between a power supply voltage and the reference node and controlled by the first clock signal.

16. The semiconductor integrated circuit of claim 15, wherein the detector further comprises a second pre-charge transistor that is connected between a power supply voltage and the check node and is controlled by the first clock signal.

17. The semiconductor integrated circuit of claim 4, wherein the one end of the sense capacitor is connected to the discharge circuit and the other end of the sense capacitor is grounded.

18. The semiconductor integrated circuit of claim 4, further comprising:
   an inverter configured to invert the first clock signal, the one end of the sense capacitor connected to the discharge circuit and the other end of the sense capacitor connected to an output of the inverter.

19. A smart card comprising:
   a hacking detector including a pre-charge capacitor connected to a pre-charged check node, a sense capacitor configured to discharge the pre-charge capacitor when the sense capacitor is exposed, and a detector configured to periodically detect whether the sense capacitor is exposed, based upon a voltage of the check node; and
   a processor resetting the smart card in response to the detection signal.

20. A hacking detecting method of a semiconductor integrated circuit comprising:
   pre-charging a pre-charge capacitor and a reference pre-charge capacitor, respectively;
   discharging the pre-charge capacitor using a sense capacitor;
   discharging the reference pre-charge capacitor using a reference capacitor; and
   determining that the semiconductor integrated circuit is hacked when an amount of remaining charge of the reference and pre-charge capacitors are over a given amount.

21. The hacking detecting method of claim 20, wherein the discharging the pre-charge capacitor comprises:
  connecting one end of the pre-charge capacitor to one end of the sense capacitor in response to a first clock signal;
  separating the one end of the pre-charge capacitor from the one end of the sense capacitor in response to the first clock signal; and
  discharging the one end of the sense capacitor in response to a second clock signal.

22. The hacking detecting method of claim 21, wherein the discharging of the reference pre-charge capacitor comprises:
  connecting one end of the reference pre-charge capacitor to one end of the reference capacitor in response to the first clock signal;
  separating the one end of the reference pre-charge capacitor from the one end of the reference capacitor in response to the first clock signal; and
  discharging the one end of the reference capacitor in response to the second clock signal.

23. The hacking detecting method of claim 22, wherein a capacitance of the sense capacitor is less than a capacitance of the pre-charge capacitor, the first and second clock signals are complementary, and the first clock signal has a duty ratio more than that of the second clock signal.

* * * * *